United States Patent [19]

Kato et al.

[11] Patent Number: 4,772,099

[45] Date of Patent: Sep. 20, 1988

[54] CAPACITIVE ELECTRODE CONFIGURATION FOR LIQUID CRYSTAL DISPLAYS

[75] Inventors: Hiroaki Kato, Tenri; Keisaku Nonomura; Kohhei Kishi; Tomio Wada, all of Nara, Japan

[73] Assignees: Sharp Kabushiki Kaisha; Japan Electronic Industry Development Association, both of Tokyo, Japan

[21] Appl. No.: 307,573

[22] Filed: Oct. 1, 1981

[30] Foreign Application Priority Data

Oct. 9, 1980 [JP] Japan .................................. 60-141559

[51] Int. Cl.[4] .............................................. G02F 1/133
[52] U.S. Cl. ........................................ 350/334; 350/336
[58] Field of Search ............................ 350/334, 333, 336

[56] References Cited

U.S. PATENT DOCUMENTS 4,021,798  5/1977  Kojima et al. .................. 350/336 X
4,202,606  5/1980  Wild et al. ........................ 350/336
4,385,292  5/1983  Nonomura et al. ............ 350/333 X
4,386,352  5/1983  Nonomura et al. ............ 350/333 X Primary Examiner—Stanley D. Miller
Assistant Examiner—David Lewis
Attorney, Agent, or Firm—Birch, Stewart, Kolasch & Birch

[57] ABSTRACT

A liquid crystal display device comprises a sandwich structure of support plates with a layer of liquid crystal filled therebetween. One support plate has an array of thin film transistors and thin film capacitors both formed thereon, while the other support plate has a counter electrode formed thereon. One of a pair of electrodes of each thin film capacitor on the one support plate is offset from the counter electrode at any area other than area where they form an effective capacitance element, the other the area where they form an effective capacitance element, the other capacitor electrodes serving as display electrodes.

1 Claim, 4 Drawing Sheets

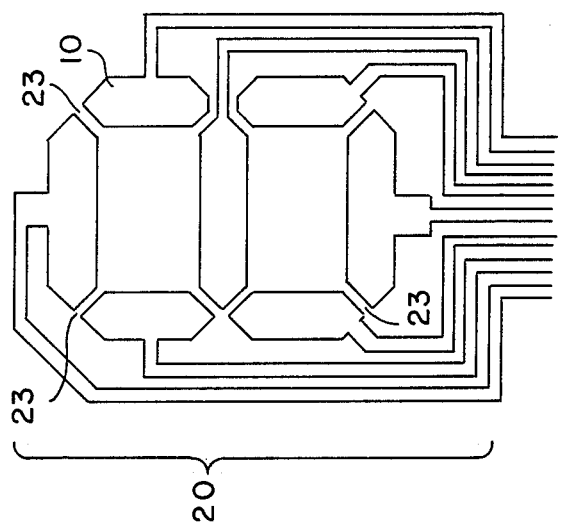
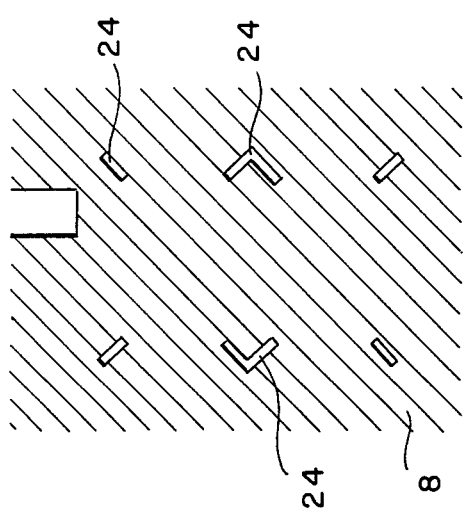
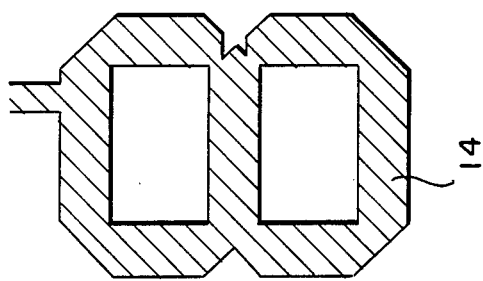
FIG.8(c)
FIG.8(b)
FIG.8(a)

CAPACITIVE ELECTRODE CONFIGURATION FOR LIQUID CRYSTAL DISPLAYS

The present invention generally relates to a liquid crystal display (LCD) device and, more particularly, to an improvement in electrode arrangement in an LCD device of a type including an array of thin film transistors.

A typical prior art LCD panel having a plurality of, for example, seven, electrode segments arranged in the shape of a figure "8" is known as having such a construction as shown in FIGS. 1 and 2 of the accompanying drawings which illustrate the panel in plan and cross-sectional views, respectively.

Referring first to FIGS. 1 and 2, the prior art LCD panel comprises a transistor array support 12 including an array of thin film transistors 7, one for each electrode segment; a corresponding number of thin film capacitors 11, each of said thin film capacitors 11 being constituted by a transparent electrode layer 8, a dielectric layer 9 and a segment electrode 10 all formed on a glass substrate 1; and a counter support 15 having a transparent counter electrode 14 deposited on a glass substrate 13 facing the segment electrodes 10. Each of the thin film transistors 7 is constituted by a gate electrode 2, a gate insulating layer 3, a semiconductor layer 4, and source and drain electrodes 5 and 6, all formed on the glass substrate 1.

The transistor array support 12 and the counter support 15 have respective transparent insulating layers of SiO or $SiO_2$ vapor-deposited thereon in face-to-face relation, which supports are subsequently subjected to a TN(twisted nematic) alignment process by means of an oblique evaporation or rubbing. The supports 12 and 15 are then sandwiched together by the use of a sealant 17 with a chamber defined therebetween. The complete display device can be obtained by subsequently injecting a liquid crystal material, such as TN-FEM liquid crystal or guest-host type liquid crystal, into the sealed chamber between the supports 12 and 15, and then placing a polarizing plate and a reflector plate externally on the respective supports.

In the prior art LCD device of the construction described with reference to and shown in FIGS. 1 and 2, an electric circuit for each electrode segment including the respective thin film transistor 7 and the associated thin film capacitor 11 can be depicted as shown in FIG. 3. In the equivalent circuit shown in FIG. 3, $C_{LC}$ represents the capacitance formed between the segment electrode 10 and the counter electrode 14, and $C_S$, represents the capacitance of the thin film condenser 11. As shown, these capacitance elements $C_{LC}$ and $C_S$ are connected in series with each other between the counter electrode 14 and the ground, the drain electrode 10 of the associated thin film transistor 7 being connected to a junction 19 between the capacitance element $C_{LC}$ and $C_S$.

The LCD panel now under discussion can be electrically driven according to a time chart shown in FIG. 4 of the accompanying drawings. A method for driving the LCD panel and its practical applicability are disclosed and discussed in the Japanese Patent Application No. 54-97912, filed in 1979, and will now be briefly described with reference to FIG. 4 while the details thereof may be had therefrom.

As shown by (A) in FIG. 4, the source electrodes 5 of the respective transistors 7 in a (i) column of a matrix receive negative and positive pulses during a period from the time $t_1$ to the time $t_2$ and a source voltage of a waveform which is zero volt during a period from the time $t_2$ to the time $t_3$ and also a period from the time $t_3$ to the time $t_4$, which source voltage is utilized to cause picture elements in the (i) column to undergo a repetition of write-in, non-write-in and non-write-in operations, respectively.

The above described source voltage cooperates with a gate voltage, applied to the gate electrodes 2, to cause the thin film transistors 7 to be sequentially switched on, off and off during the period from the time $t_1$ to the $time_4$ at an odd-numbered frame and also to be sequentially switched off, on and on during the period from the time $t'_1$ to the time $t'_2$ at an even-numbered frame. Therefore, the source voltage is of a zero value during the period from the time $t'_1$ to the time $t'_2$, in the form of negative and positive pulses during the period from the time $t'_2$ to the time $t'_3$ and in the form of negative and positive pulses during the period from the time $t'_3$ to the time $t'_4$. (B) in FIG. 4 represents the waveform of the gate voltage applied to the gate electrodes of the transistors in (j) row of the matrix. (C) and (D) represent the waveform of gate voltages applied to the gate electrodes of the transistors in (j+1) and (j+2) rows of the same matrix, respectively. These gate voltages are successively applied to the gate electrodes 2 so that the gate electrodes in each row can be sequentially scanned.

(E), (F) and (G) shown in FIG. 4, represent the waveforms of common voltages applied to the counter electrodes 14 in the respective (j), (j+1) and (j+2) rows of the matrix. During the scanning at the time of the even-numbered frame, the counter electrodes 14 in the same row as the gate electrodes 2 to which the respective gate voltages are applied are applied with the common voltages $V_{cj}$, $V_{cj+1}$ and $V_{cj+2}$, respectively, in synchronism with the application of such gate voltages.

Therefore, the picture element at the (ij) position in the matrix, that is, the liquid crystal 18 in the LCD element located at the intersection between the (i) column and the (j) row in the matrix, has applied the source voltage subsequent to the switching-on of the corresponding thin film transistors 7 which has been effected by the simultaneous application of the source voltage in the (i) column and the gate voltage in the (j) row during the odd-numbered frame, resulting in the application of a voltage $V_{LCij}$ of the waveform, shown by (H) in FIG. 4, to the picture element at the (ij) position in the matrix to write in such picture element.

During the subsequent scanning period, the picture element at the (ij+1) position in the matrix is not written in at the odd-numbered frame because the voltage $V_{LCij+1}$ of the waveform, shown by (I) in FIG. 4, then applied thereto is zero volt with the thin film transistors 7 at the (ij+1) position being switched off.

Even during the next succeeding scanning that takes place in the (j+2) row of the matrix, a similar operation as hereinabove described occurs and, therefore, no write-in takes place.

The above described operation takes place until the last place completing the entire picture is executed, thereby completing one frame scanning.

At the next succeeding frame, that is, the even-numbered frame, in order for the thin film transistors 7 to operate in a manner reverse to that described above, the source voltages are applied in synchronism with the gate voltages to switch the transistors 7 at the (ij), (ij+1) and (ij+2) rows off, on and on, respectively.

With respect to the picture elements, the associated transistors of which are switched off, the respective voltages of the waveforms (E), (F) and (G) are applied to the counter electrodes 14 and, on the other hand, the voltage of the waveform (H) which is in reversed relation to that appearing at the odd-numbered frame is applied to the associated liquid crystals 18.

With respect to the liquid crystals in the picture elements, the associated transistors of which are switched on, the source voltage $V_{si}$ and the common voltages $V_{cj+1}$ and $V_{cj+2}$ are simultaneously applied and, since these voltages have the same polarity, waveform and magnitude, no voltage is applied to such liquid crystals 18 as shown by (I) and (J) in FIG. 4.

Where the LCD panel is designed to be driven in the manner as hereinbefore described, the counter electrodes 14 are required one for each column in the matrix, resulting in a complicated manufacturing process for liquid crystal cells as well as a complicated design of a drive circuit for the counter electrodes 14. However, even though the thin film transistors having a relatively small ratio of the off-resistance $R_{off}$ relative to the on-resistance $R_{on}$, that is, $R_{off}/R_{on}$, are utilized, an ideal A.C. drive with no substantial D.C. component can advantageously be performed unless any deviation is found in their characteristics.

However, when it comes to driving the LCD panel of the construction of FIGS. 1 and 2 by the use of the above described driving method, while a display unit 20 is activated by applying a voltage between the segment electrode or electrodes 10 and the counter electrode 14, a voltage of the waveform shown by (E), (F) or (G) in FIG. 4 and having a D.C. component tends to be applied between the transparent electrode or electrodes 8 and the counter electrode 14 independently of the information to be displayed, since the transparent electrode layer 8 of each thin film capacitor 11 is held in face-to-face relation to the counter electrode 14 through the dielectric layer 9 and the liquid crystal 18.

Therefore, the molecular orientation of the liquid crystal 18 sandwiched between the transparent electrode layer 8 and the counter electrode 14 is affected by the electrical field to such an extent that an area 21 other than the area which is occupied by the display unit 20 may be colored lightly, reducing both the quality and the reliability of the liquid crystal display panel.

The present invention has, therefore, been developed with a view to substantially eliminating the drawbacks inherent in the prior art LCD device and has for its essential object to provide an improved LCD device wherein an area of the liquid crystal where the D.C. component of the applied voltage is applied is eliminated substantially or minimized.

The present invention is directed to an LCD device wherein a layer of liquid crystal is sandwiched between the transistor array support and the counter support on which the counter electrode cooperable with the segment electrodes is formed. According to the present invention each electrode underneath the respective thin film capacitor and the counter electrode do not face towards each other at any area other than the area where they constitute an effective capacitance element. By such construction any possible reduction in quality of information displayed by the device and also any possible deterioration of the liquid crystal, both tending to result from the application of the D.C. component to the liquid crystal, can be advantageously minimized or substantially eliminated.

These and other objects and features of the present invention will readily be understood from the following detailed description made in connection with preferred embodiments thereof with reference to the accompanying drawings, in which;

FIG. 8(a) is a view similar to FIG. 6(a), showing a further modified form of the counter electrode; and FIG. 8(b) is a view similar to FIG. 6(b), showing the transparent electrode layer cooperable with the counter electrode of FIG. 8(a).

Figure 1:
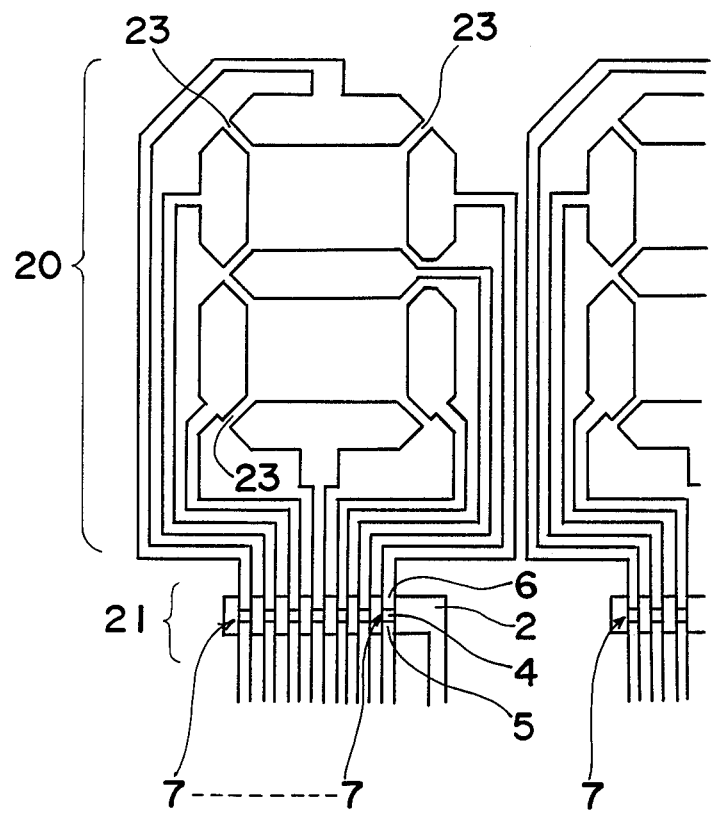
FIG. 1 is a top plan view of the prior art LCD panel.
Figure 2:
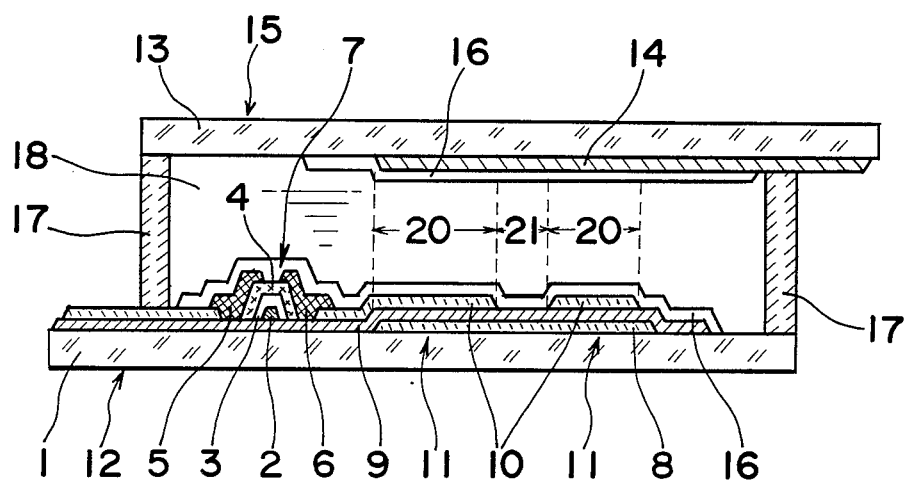
FIG. 2 is a cross-sectional representation of the device shown in FIG. 1.
Figure 3:
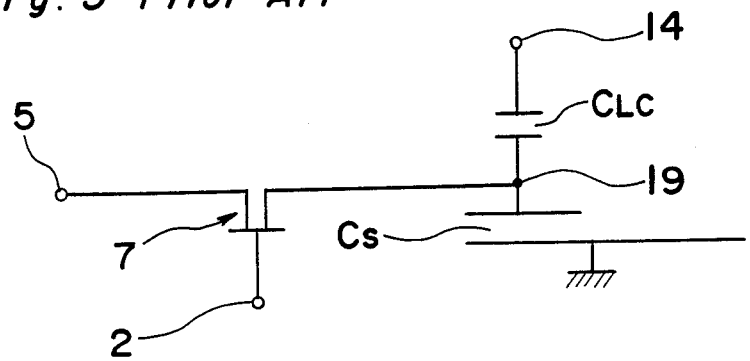
FIG. 3 is a schematic diagram showing an equivalent electric circuit of one display segment used in the device of FIG. 1.
Figure 4:
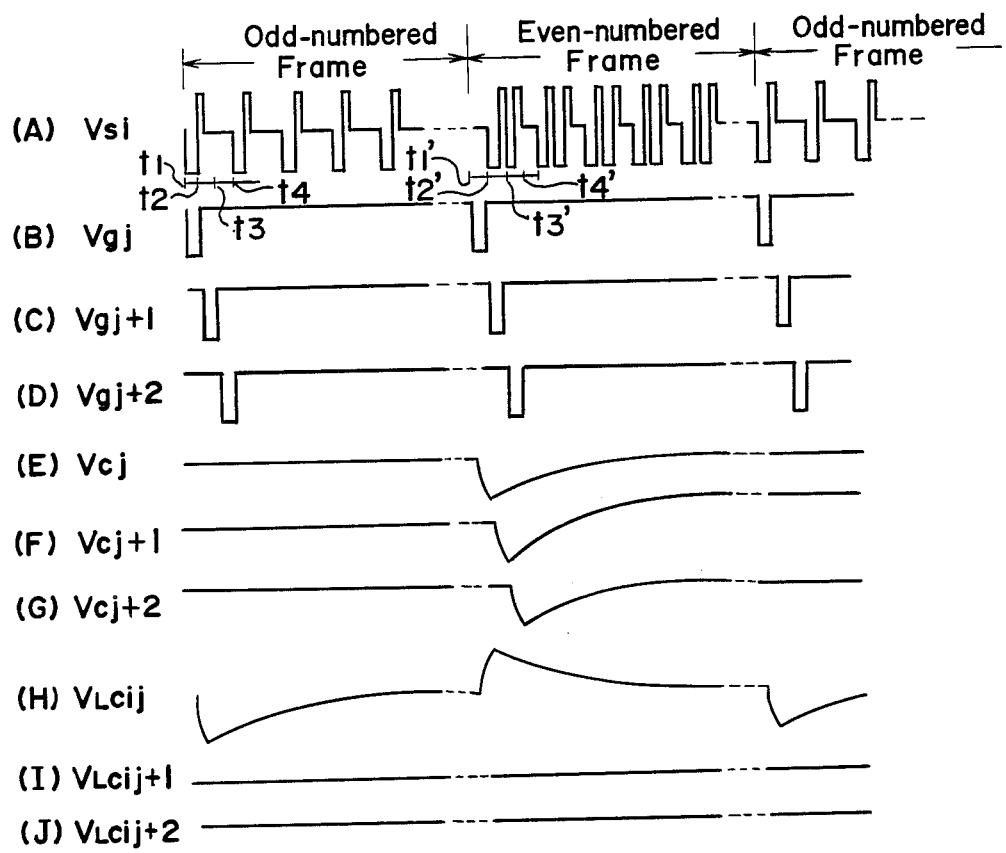
FIG. 4 is a time chart showing the waveforms of various signals in timed relation, which signals are used to drive the device.
Figure 6C:
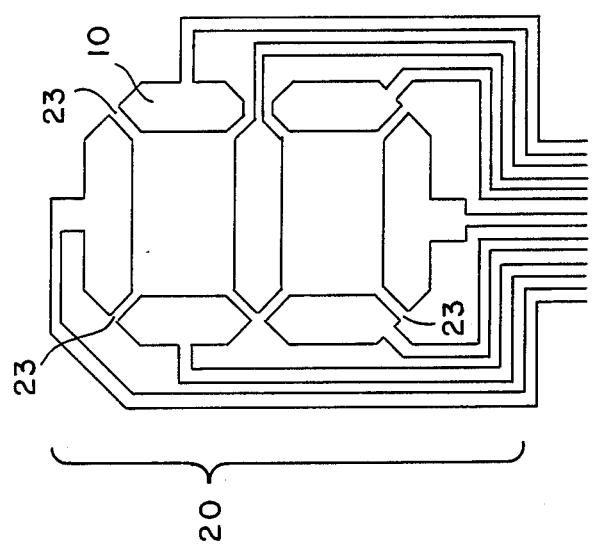
FIG. 6(a) is a top plan view, on an enlarged scale, showing one form of a counter electrode used in the device of the present invention.
FIG. 6(b) is a view similar to FIG. 6(a), showing the shape of a transparent electrode layer cooperable with the counter electrode of FIG. 6(a)
Figure 6B:
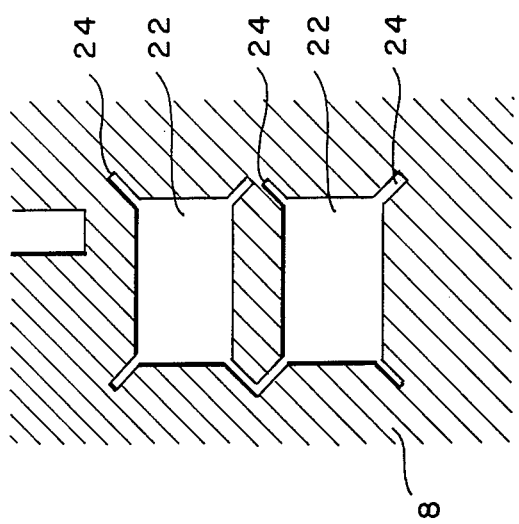
Figure 6A:
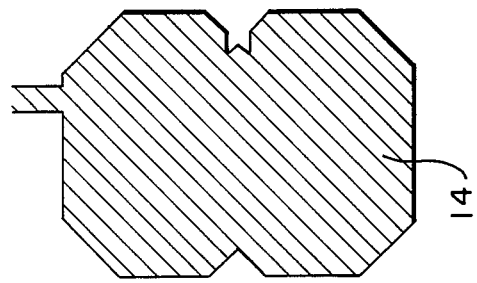

FIGS. 6(c)–8(c) illustrate arrangements and configurations of segment electrodes, corresponding to those shown in FIG. 1, used in combination with the electrodes of FIGS. 6(a) and (b) through 8(a) and (b), respectively.

It is to be noted that like parts are designated by like reference numerals throughout the accompanying drawings.

Figure 5:
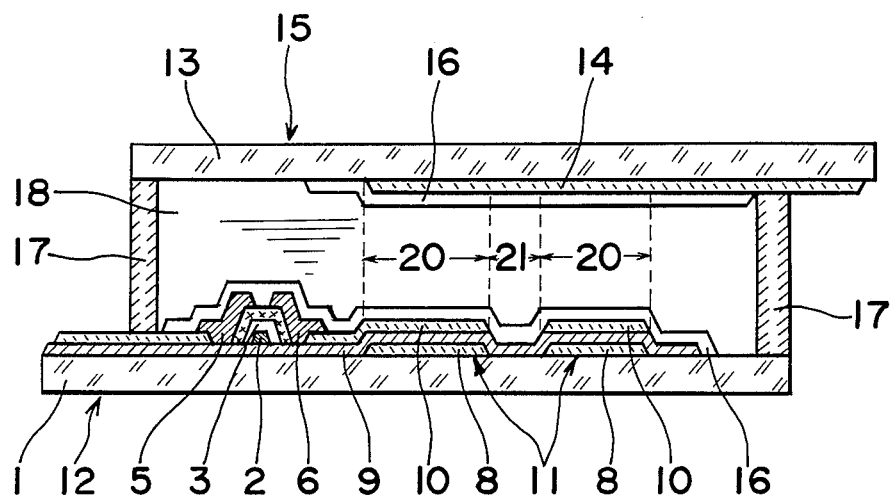
FIG. 5 is a view similar to FIG. 2, showing a LCD device embodying the present invention.

Referring now to FIG. 5, the transparent electrode layer 8 forming an underside electrode of each thin film capacitor 11 does not face towards the counter electrode 14 at any area other than the area aligned with the respective segment electrode 10.

For this purpose, the counter electrode 14 and the transparent electrode layer 8 may have respective patterns as shown in FIGS. 6(a) and 6(b), respectively. As shown in FIG. 6(a), the counter electrode 14 is generally of the shape following the outer contour of the segment electrodes 10 arranged generally in the shape of a Figure "8" illustrated in FIG. 6(c) and corresponding to the pattern of FIG. 1.

On the other hand, as shown in FIG. 6(b), the transparent electrode layer 8 has a pair of generally rectangular open spaces or non-electrode areas 22 defined therein at respective positions in registry with the spaced eyes of the figure "8" defined by the segment electrodes 10. The transparent electrode layer 8 also has two groups of four slits 24 one group for each non-electrode area 22, the four slits 24 of each group being in communication or continuity to and extending outwardly from the respective four corners of the corresponding non-electrode area 22 in alignment with associated spaces 23 (FIG. 1) which separate adjacent segment electrodes 10 from each other.

By employing such patterns as shown in FIGS. 6(a) and 6(b) for the counter electrode 14 and the transparent electrode layer 8, the area of the liquid crystal 18 where the D.C. component of the applied voltage works can be advantageously eliminated and, therefore, an LCD device of improved quality having a relatively long life time can be obtained.

Figure 7C:
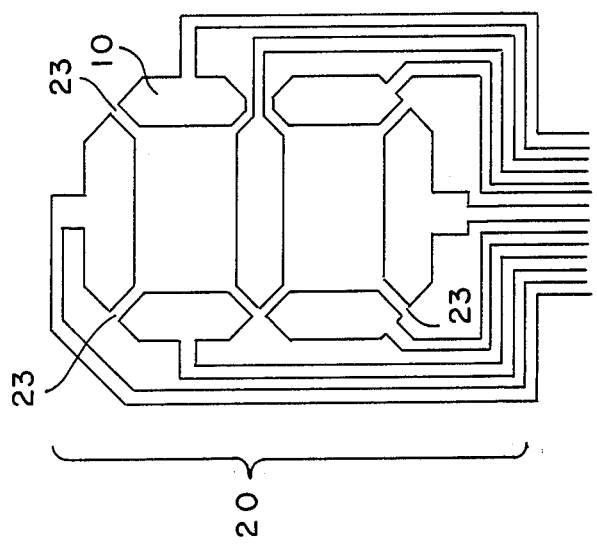
FIG. 7(a) is a view similar to FIG. 6(a), showing a modified form of the counter electrode.
FIG. 7(b) is a view similar to FIG. 6(b) showing the transparent electrode layer cooperable with the counter electrode of FIG. 7(a)
Figure 7B:
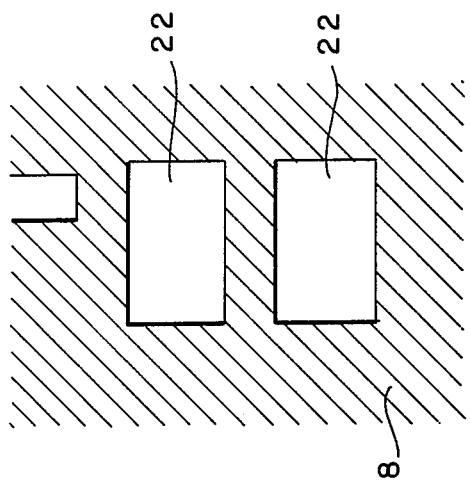
Figure 7A:
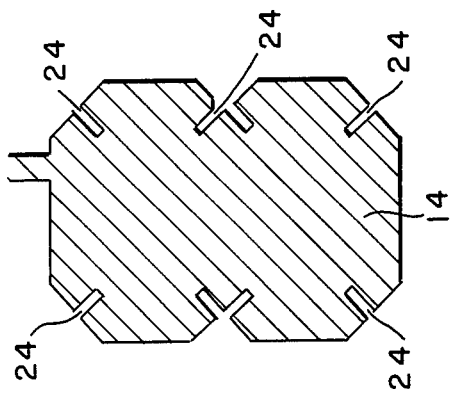

In the embodiment shown in FIGS. 6(a) and 6(b), the slits 24 have been described as formed in the transparent electrode layer 8. However, as shown FIG. 7(a), they may be formed in the counter electrode 14 at respective positions in registry with the spaces 23 separating the neighbouring segment electrodes 10 (FIG. 7(c). In this case, the non-electrode areas 22 in the transparent electrode layer 8 utilizeable in combination with the counter electrode 14 of the pattern shown in FIG. 7(a) are shaped as shown in FIG. 7(b).

In addition, while in the embodiment shown in FIGS. 6(a) and 6(b), the non-electrode areas 22 have been described as formed in the transparent electrode layer 8, they may be formed in the counter electrode 14 as shown in FIG. 8(a). In this case, the slits 24 in the transparent electrode layer 8 utilizeable in combination with the counter electrode 14 of the pattern shown in FIG. 8(a) are shaped as shown in FIG. 8(b) (and the segment electrodes of FIG. 8(c)).

When the counter electrode 14 and the transparent electrode layer 8 are patterned in the manner as shown in FIGS. 7(a) and 7(b) or FIGS. 8(a) and 8(b), not only can the device function in the same way as the device according to the embodiment of FIGS. 6(a) and 6(b), but also the same effect and advantages can be appreciated.

From the foregoing full description of the present invention, it is clear that, since the area of the liquid crystal in the prior art LCD device where the D.C. component of the applied voltage works has been minimized or substantially eliminated, the LCD device according to the present invention has no possibility of an unnecessary display taking place which would result from the application of the D.C. component to the liquid crystal layer. Therefore, the device of the present invention is not only durable, but also of high quality.

Although the present invention has fully been described in connection with the several preferred embodiment, it should be noted that various changes and modifications are apparent to those skilled in the art. By way of example, the respective patterns for the counter electrode and the transparent electrode layer may not be limited to that shown in and described with reference to FIGS. 6 to 8, but may be of any suitable shape as long as the objective of the present invention can be accomplished. Moreover, the concept of the present invention can equally be applicable to any LCD device wherein the electrode segments are arranged in any shape other than the shape of the Figure "8".

Accordingly, such changes and modification are to be understood as included within the scope of the present invention unless they depart therefrom.

What is claimed is:

1. In a liquid crystal display device which comprises a sandwiched structure including a first plate-like support having an array of thin film transistors formed thereon, each of said transistors having a gate electrode, a source electrode and a drain electrode, and thin film capacitors also formed thereon, each of said capacitors having a pair of capacitor electrodes, one of said capacitor electrodes of each capacitor being electrically connected to the drain electrode of the respective transistor and serving as a segment electrode for the device, a second plate-like counter support having at least one counter electrode formed thereon in face-to-face relation to the segment electrodes, and a layer of liquid crystal material filled in a sealed chamber defined between the first transistor array support and the second counter support, wherein the other of said capacitor electrodes is face-to-face with said at least one counter electrode only where said at least one counter electrode is also face-to-face with said segment electrodes.

* * * * *